US012794023B2

(12) United States Patent
Zheng et al.

(10) Patent No.: US 12,794,023 B2

(45) Date of Patent: Nov. 10, 2026

(54) DEVICE WITH SHEET STRUCTURE FOR DETECTING LIQUID LEAKAGE OF BATTERY

(71) Applicant: HANGZHOU GOLD ELECTRONIC EQUIPMENT CO., LTD., Hangzhou (CN)

(72) Inventors: Yi Zheng, Hangzhou (CN); Chenqiang Xia, Hangzhou (CN); Jianhong Xu, Hangzhou (CN); Cunye Lin, Hangzhou (CN)

(73) Assignee: HANGZHOU GOLD ELECTRONIC EQUIPMENT CO., LTD., Hangzhou (CN)

( * ) Notice: Subject to any disclaimer, the term of this patent is extended or adjusted under 35 U.S.C. 154(b) by 258 days.

(21) Appl. No.: 18/749,323

(22) Filed: Jun. 20, 2024

(65) Prior Publication Data

US 2024/0339676 A1 Oct. 10, 2024

Related U.S. Application Data

(63) Continuation of application No. PCT/CN2023/138804, filed on Dec. 14, 2023.

(30) Foreign Application Priority Data

Dec. 19, 2022 (CN) ......................... 202211633946.2

(51) Int. Cl.

*H01M 10/42* (2006.01)
*G01M 3/16* (2006.01)

(Continued)

(52) U.S. Cl.

CPC ....... *H01M 10/4228* (2013.01); *G01M 3/165* (2013.01); *G01M 3/186* (2013.01); *H01M 10/48* (2013.01)

(58) Field of Classification Search

None

See application file for complete search history.

(56) References Cited

U.S. PATENT DOCUMENTS

| | | | |
|---|---|---|---|
| 8,088,331 | B2 | 1/2012 | Ueda et al. |
| 8,211,559 | B1 | 7/2012 | Waggoner |

(Continued)

FOREIGN PATENT DOCUMENTS

| | | | |
|---|---|---|---|
| CN | 102680191 | A | 9/2012 |
| CN | 110160712 | A | 8/2019 |

(Continued)

OTHER PUBLICATIONS

Internation Search Report of PCT/CN2023/138804, Mailed Apr. 8, 2024.

*Primary Examiner* — Mark A Shabman

(57) ABSTRACT

A device with a sheet structure for detecting liquid leakage of battery includes a housing made of an insulating material, and a first and a second detection elements provided in the housing and each made of a conductive material. The first and second detection elements are spaced apart; multiple detection channels are provided in a bottom surface of the housing, and a layer of gap extending in a horizontal direction is provided inside the housing, and an inner end of each detection channel is in communication with the gap; a first collecting end of the first detection element and a second collecting end of the second detection element are provided on an outer surface of the housing, and a first detection end of the first detection element and a second detection end of the second detection element are provided in the gap and are adjacent to the detection channel.

7 Claims, 5 Drawing Sheets

(51) Int. Cl.
*G01M 3/18* (2006.01)
*H01M 10/48* (2006.01)

(56) References Cited

U.S. PATENT DOCUMENTS

| | | | | |
|---|---|---|---|---|
| 9,136,564 | B2 | 9/2015 | Yang et al. | |
| 2005/0255381 | A1* | 11/2005 | Shen | H01M 10/48 429/185 |
| 2007/0275296 | A1* | 11/2007 | Ueda | G01M 3/16 429/61 |
| 2015/0147607 | A1* | 5/2015 | Fukuhara | H01M 10/658 429/61 |

FOREIGN PATENT DOCUMENTS

| | | | |
|---|---|---|---|
| CN | 111337201 | A | 6/2020 |
| CN | 112345172 | A | 2/2021 |
| CN | 214149694 | U | 9/2021 |
| CN | 116224066 | A | 6/2023 |
| JP | 2004093246 | A | 3/2004 |
| JP | 2005228659 | A | 8/2005 |
| JP | 2005293881 | A | 10/2005 |
| KR | 20120064229 | A | 6/2012 |
| KR | 20220124319 | A | 9/2022 |

* cited by examiner

DEVICE WITH SHEET STRUCTURE FOR DETECTING LIQUID LEAKAGE OF BATTERY

CROSS-REFERENCE TO RELATED APPLICATIONS

This application is a continuation of International Patent Application No. PCT/CN2023/138804 with a filing date of Dec. 14, 2023, designating the United States, now pending, and further claims priority to Chinese Patent Application No. 202211633946.2 with a filing date of Dec. 19, 2022. The content of the aforementioned application, including any intervening amendments thereto, is incorporated herein by reference.

TECHNICAL FIELD

The present disclosure relates to the field of batteries, and in particular, to a device with a sheet structure for detecting liquid leakage of battery.

BACKGROUND

With the rapid development of new energy fields, such as electric vehicles and energy storage power stations, lithium-ion power batteries, lead-acid storage batteries, and other electrochemical batteries are put to use. For electric vehicles, energy storage power stations, and other environments, it is necessary to use a large number of batteries connected in parallel and/or series to form high-voltage battery packs. However, due to the huge number of batteries, unqualified technologies, abuse, and other reasons, the safety problems of batteries are increasingly prominent, and liquid leakage of battery is common. The liquid leakage of battery means that a liquid inside the battery flows out from a gas safety valve or other joints of the battery. The liquid leakage of battery has a great impact on performance of the battery, and severe liquid leakage of battery may cause a short circuit of the battery. The short circuit of the battery is the most dangerous battery failure mode, which may cause battery combustion or even explosion. Therefore, detection of liquid leakage of battery is very important for safe operation of the battery.

In the prior art, in order to ensure the safe and effective operation of the battery, a state of the battery is detected and managed mainly by a battery management module. At present, the battery management module mainly measures a voltage, a temperature, and a charging/discharging current of the battery, and monitors insulation of a system. Only when the battery leaks to a certain extent, for example, when the battery is short-circuited with a battery box, an early warning against system insulation reduction is given, so as to inform relevant personnel to repair the battery. However, this method has some limitations on timeliness of liquid leakage detection of the battery. That is to say, an early warning is not given before the battery is short-circuited with the battery box, and detection results lag behind, which makes it impossible to give an early warning against liquid leakage of battery in time.

SUMMARY OF PRESENT INVENTION

In order to solve the above problems, an objective of the present disclosure to provide a device with a sheet structure for detecting liquid leakage of battery, to quickly detect a liquid leakage state of the battery, reduce lag of a detection result, and feed back detection information in time.

To achieve the objective of the present disclosure, the following technical solutions are used:

A device with a sheet structure for detecting liquid leakage of battery includes a housing made of an insulating material, and a first detection element and a second detection element that are arranged in the housing and each are made of a conductive material, where the first detection element and the second detection element are spaced apart by the housing and thus are not in contact with each other; multiple detection channels are provided in a bottom surface of the housing, and a layer of gap extending in a horizontal direction is provided inside the housing, and an inner end of each detection channel is in communication with the gap; a first collecting end of the first detection element is provided on an outer surface of the housing, and a first detection end of the first detection element is provided in the gap and is adjacent to the detection channel; a second collecting end of the second detection element is provided on the outer surface of the housing, and a second detection end of the second detection element is provided in the gap and is adjacent to the detection channel.

Preferably, the housing includes a bottom plate and a cover plate provided above the bottom plate, the bottom plate comprises a detection area, and the multiple detection channels are located in the detection area; a bottom surface of the cover plate is provided with an accommodating area recessed upward, and a shape of the accommodating area is adapted to a shape of the detection area and the accommodating area is located above the detection area, so that the gap is formed between the bottom plate and the cover plate.

Preferably, the housing is in a shape of a thin plate or a slice; and the detection area in the bottom plate has a thickness not greater than 2 mm.

Preferably, the detection channels each has a height not greater than 2 mm; and multiple detection channels are densely provided in the detection area to cover most of a surface of the detection area.

Preferably, the first detection element has a plurality of first detection ends, the second detection element has a plurality of second detection ends, two sides of each detection channel is provided with one first detection end and one second detection end, and the plurality of first detection ends and the plurality of second detection ends extend along a lengthwise direction of the detection channels.

Preferably, the first detection element and the second detection element are respectively provided at two ends of the detection channels, and the first detections end and the second detection ends extend in opposite directions.

Preferably, the first detection element includes a first trunk provided on a side of the bottom plate, a plurality of first branches are provided on a side of the first trunk, and the plurality of first branches are the plurality of first detection ends; each first branch extends along of the lengthwise direction of the detection channels, and an end portion of the first branch terminates on an end portion of the detection channel; a first collecting member is provided at an end of the first trunk, and an end portion of the first collecting member extends out of the outer surface of the housing.

Preferably, the second detection element includes a second trunk provided on a side of the bottom plate, a plurality of second branches are provided on a side of the second trunk, and the plurality of second branches are the second detection ends; each second branch extends along a side of the detection channel, and an end portion of the second branch terminates on an end portion of the detection channel; a second collecting member is provided at an end of the second trunk, and an end portion of the second collecting member extends out of the outer surface of the housing.

To sum up, the present disclosure has the advantages that detection channels are provided at a bottom of a housing, so that a leaked liquid can enter a gap inside the housing from the detection channels, and then a first detection end and a second detection end on two sides of each detection channel are connected together. Therefore, when liquid leakage of battery occurs, a first detection element is connected to a second detection element, and resistance between a first collecting end and a second collecting end is hence reduced, and it is hence determined that liquid leakage of battery occurs. The device can improve timeliness and accuracy of a detection result.

DETAILED DESCRIPTION OF THE EMBODIMENTS

The present application provides a device with a sheet structure for detecting liquid leakage of battery, which is usually provided on a safety valve of a battery or at a joint of a battery housing. The device is configured to detect liquid leakage of battery at these positions.

Figure 1:
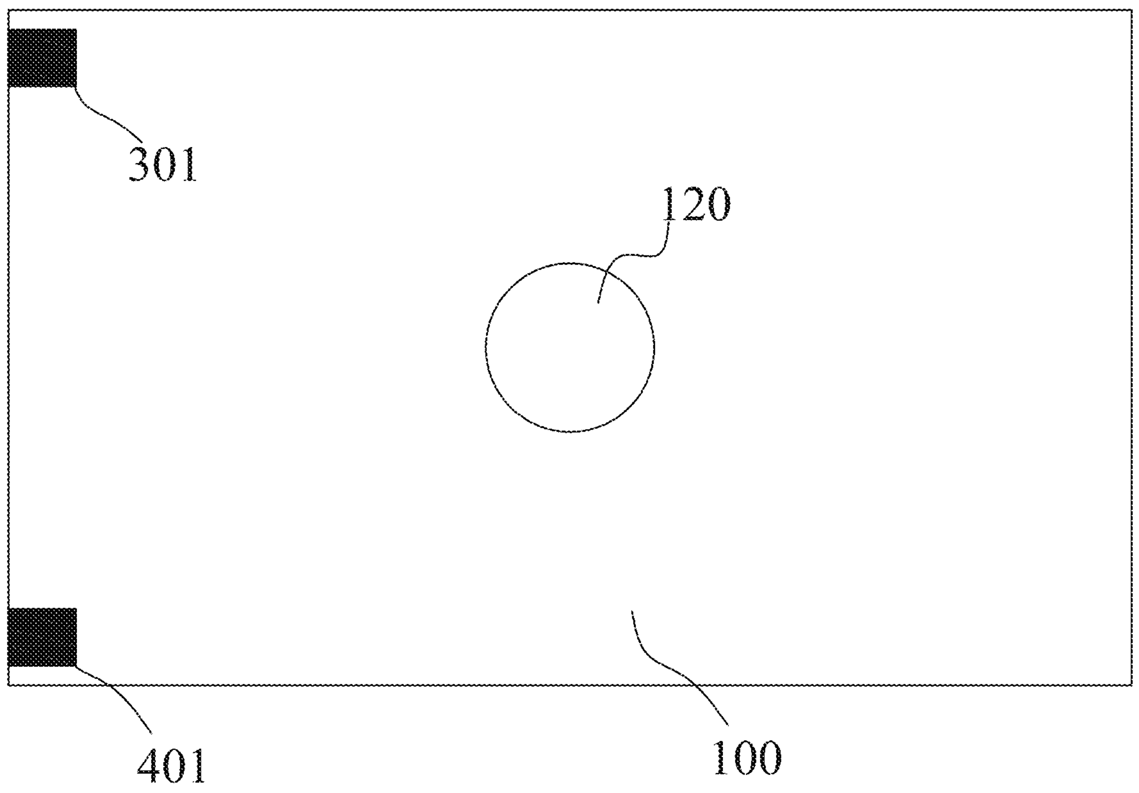
FIG. 1 is a top view of a device for detecting liquid leakage of battery.

FIG. 1 is a top view of a device for detecting liquid leakage of battery. The device includes a cover plate 100 made of an insulating material. For example, the cover plate 100 may be a printed circuit board (PCB). In addition, the cover plate 100 may be a hard material or a flexible material.

Figure 2:
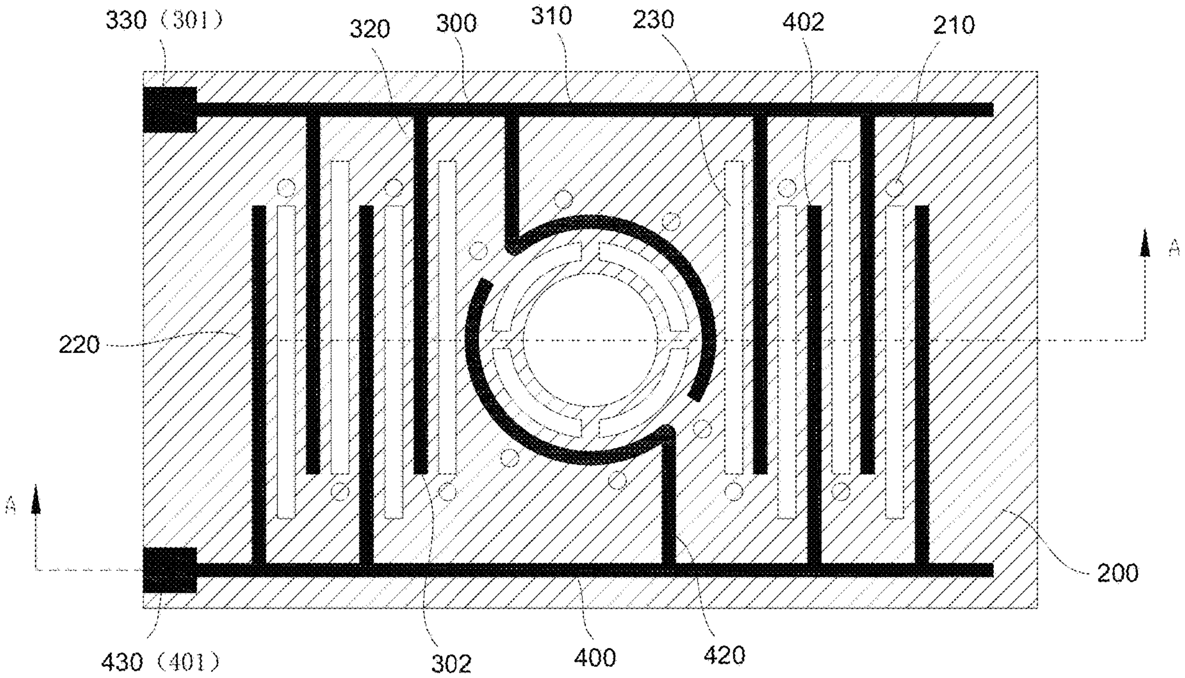
FIG. 2 is a top view of the device with a cover plate removed.

FIG. 2 is a top view of the device with the cover plate 100 removed. The device further includes a bottom plate 200 provided below the cover plate 100. The bottom plate 200 is also made of an insulating material, may be a PCB, or may also be made of a hard material or a flexible material. The bottom plate 200 and the cover plate 100 together constitute a housing of the device, and the housing is in the shape of a slice or a thin plate. During use, a bottom surface of the bottom plate 200 is provided on an outer surface of the battery, and generally, may be provided on the outer surface of the battery by pasting.

In order to facilitate assembly between the bottom plate 200 and the cover plate 100, the bottom plate and the cover plate may be connected in a detachable manner such as insertion or snap-fit connection, or the bottom plate 200 and the cover plate 100 may be integrally formed. For example, in this embodiment, the bottom plate 200 and the cover plate 100 are connected to each other in an inserted manner through concave-convex fitting. Specifically, an upper surface of the bottom plate 200 is provided with a plurality of cylindrical protruding points 210, and a lower surface of the cover plate 100 is provided with grooves (not shown) corresponding to the protruding points 210. During assembly, the protruding points 210 are inserted into the grooves to assemble the cover plate 100 and the bottom plate 200 together. Obviously, the positions of the protruding points 210 and the grooves can be interchanged, which does not affect assembly of the bottom plate 200 and the cover plate 100.

Figure 5:
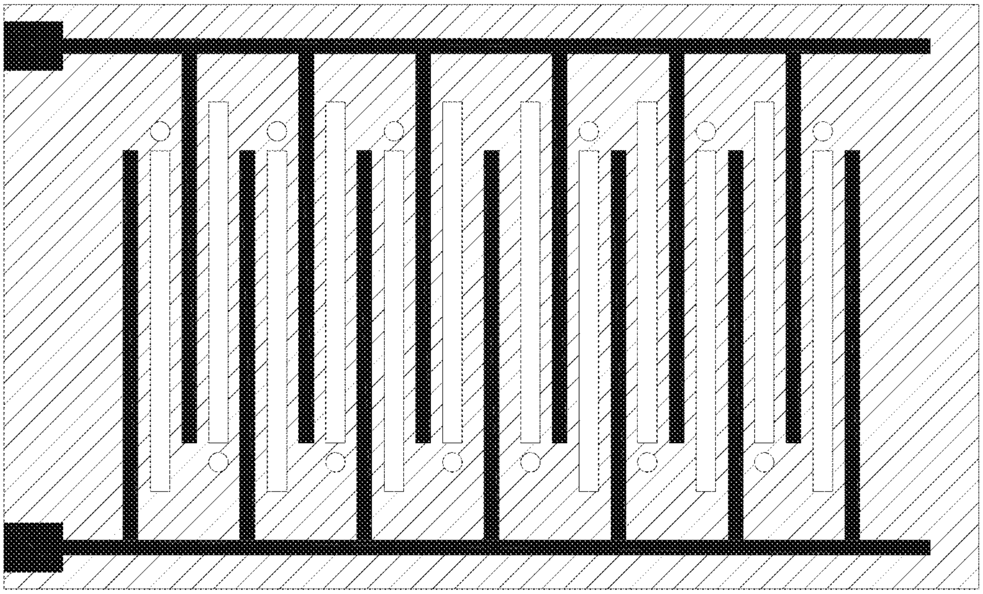
FIG. 5 is a top view of a device according to another embodiment with a cover plate removed.

As shown in FIGS. 1 and 2, a middle portion of the housing is provided with an opening 120 that runs through an upper surface and a lower surface, and the opening 120 corresponds to the safety valve of the battery. That is, in this embodiment, the housing is provided on the safety valve. However, in other embodiments, as shown in FIG. 5, the housing may be alternatively provided with no opening 120. At this time, the device may be provided at a joint of the battery.

Figure 4:
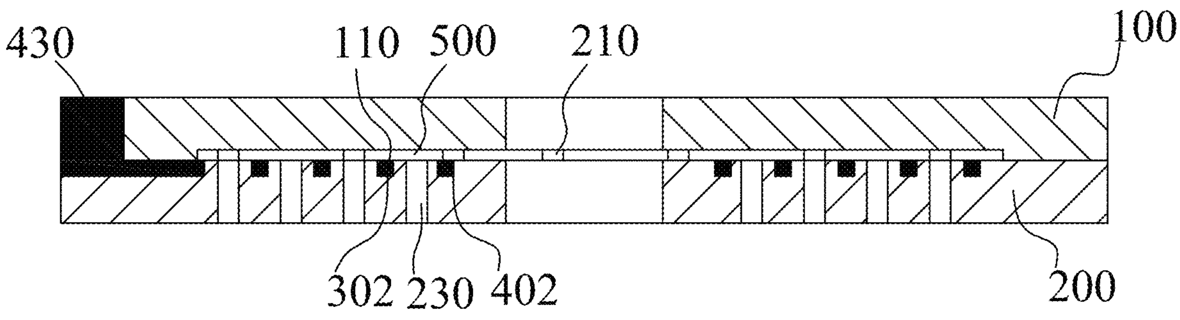
FIG. 4 is a sectional view of the device shown in FIG. 3 adding a substrate.

As shown in FIGS. 2 and 4, the bottom plate 200 is provided with a detection area 220 configured to detect liquid leakage of battery. The detection area 220 covers most of the bottom plate 200 to improve detection accuracy and prevent missed detection. A bottom surface of the cover plate 100 is provided with an accommodating area 110 corresponding to the detection area 220, and the accommodating area 110 is similar to or slightly greater than the detection area 220 in shape. The accommodating area 110 is recessed upward and is fitted above the detection area 220, thereby forming a gap 500 therebetween.

As shown in FIGS. 2 and 4, multiple detection channels 230 running through an upper surface and a lower surface of the bottom plate 200 are provided in the detection area 220, and a height of each detection channel 230, or a thickness of the detection area 220 in the bottom plate 200, is not greater than 2 mm. Therefore, it is ensured that when there is a leaked liquid at a bottom of the detection channel 230, the leaked liquid can flow upward along the detection channel 230 and enters the gap 500 between the bottom plate 200 and the cover plate 100, as shown in FIG. 4. Moreover, since the detection channel 230 has a very small height, even if there is only a small amount of leaked liquid at the bottom of the bottom plate 200, the detection channel 230 can still convey the leaked liquid, thus ensuring the timeliness of detection.

In this embodiment, these detection channels 230 are distributed in a length direction of the bottom plate 200 and extend in a straight line in a width direction, so that the detection channels 230 are densely distributed in the bottom plate 200. Therefore, the detection channels 230 can cover most of the surface of the bottom plate 200, so that the leaked liquid from each position on the bottom plate 200 can enter a detection channel 230 at a corresponding position. It should be noted that the detection channel 230 may alternatively extend in a curved manner, for example, the detection channel 230 is in the shape of an arc or a crease line.

As shown in FIG. 2, the bottom plate 200 is provided with a first detection element 300 and a second detection element 400, and the first detection element 300 and the second detection element 400 each are made of conductive material. For example, the first detection element 300 and the second detection element 400 each may be made of a solid metal material, preferably copper foil or aluminum foil. The first detection element 300 and the second detection element 400 are spaced apart by the bottom plate 200, and thus are not in direct contact with each other. In other words, in a normal state, resistance between the first detection element 300 and the second detection element 400 is infinite.

The first detection element 300 and the second detection element 400 each have a plurality of detection ends, and these detection ends are distributed on two sides of the detection channel 230 and are located in the gap 500. That is, an upper surface of each detection end is in contact with the gap 500. When there is a leaked liquid in the detection channel 230, the leaked liquid flows into the gap 500 and then flows into the detection end. When the detection end of the first detection element 300 is connected to the detection end of the second detection element 400 by the leaked liquid, the first detection element 300 is connected to the second detection element 400. At this time, the resistance between the first detection element 300 and the second detection element 400 is measured, and it is found that the resistance is significantly reduced, which is used as a standard for detecting liquid leakage of battery. For example, a battery management system can monitor a resistance value between the first detection element 300 and the second detection element 400 in real time, and monitor the resistance value between the first detection element 300 and the second detection element 400 while detecting information such as a voltage, a temperature and a current of the battery.

Figure 3:
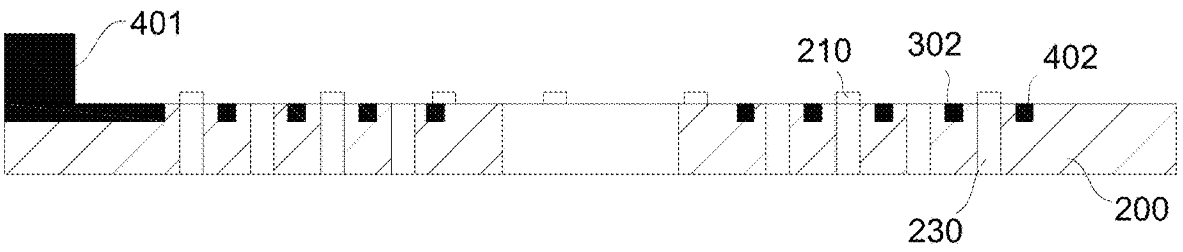
FIG. 3 is a sectional view along line A-A shown in FIG. 2.

As shown in FIGS. 2 and 3, the first detection element 300 has a first collecting end 301, and the first collecting end 301 extends outward to the surface of the housing. Specifically, in this embodiment, the first collecting end 301 extends out to a top surface of the cover plate 100. The first detection element 300 further has multiple first detection ends 302. As mentioned above, the first detection ends 302 are distributed on a side of the detection channel 230, and the first detection ends 302 extend in the same direction around the detection channel 230, so as to ensure that the leaked liquid at any position in the detection channel 230 can be in contact with the first detection ends 302.

Similarly, the second detection element 400 has a second collecting end 401, and the second collecting end 401 also extends out to the surface of the housing. Specifically, in this embodiment, the second collecting end 401 extends out to the top surface of the cover plate 100. The second detection element 400 further has multiple second detection ends 402. The second detection ends 402 are distributed on a side of the detection channel 230, and extend in the same direction around the detection channel 230, so as to ensure that the leaked liquid at any position in the detection channel 230 can be in contact with the second detection ends 402.

Further, as shown in FIG. 2, a first detection end 302 and a second detection end 402 are respectively provided on two sides of each detection channel 230, so that when there is a leaked liquid in one of the detection channels 230, the first detection end 302 and the second detection end 402 adjacent to this detection channel 230 are connected to each other. Therefore, the first detection element 300 is connected to the second detection element 400, to ensure that the first detection end 302 and the second detection end 402 can accurately detect the leaked liquid, ensure accuracy of a detection result, and prevent missed detection.

Optionally, as shown in FIG. 2, the first detection element 300 and the second detection element 400 are respectively provided at two ends of the detection channel 230, and detection ends of the first detection element and the second detection element extend toward each other. Specifically, in this embodiment, the first detection element 300 is provided at an upper end of the detection channel 230, and the second detection element 400 is provided at a lower end of the detection channel 230. The first detection end 302 extends from top to bottom and the second detection end 402 extends from bottom to top.

More specifically, as shown in FIG. 2, the first detection element 300 includes a first trunk 310, and the first trunk 310 is provided on a side (upper side in FIG. 2) of the bottom plate 200. The first trunk 310 extends along a straight line, and multiple first branches 320 are provided on a side (lower side in FIG. 2) of the first trunk 310. These first branches 320 are the first detection ends 302 described above. The first branches 320 extend in a straight line along a side of the detection channel 230, and an end portion of each first branch 320 terminates on an end portion of the detection channel 230. A first collecting member 330 extending to the surface of the housing is provided at an end (left end in FIG. 2) of the first trunk 310, and the end portion of the first collecting member 330 is the first collecting end 301 described above.

The second detection element 400 includes a second trunk 410, and the second trunk 410 is provided on the other side (lower side in FIG. 2) of the bottom plate 200. The second trunk 410 extends along a straight line, and multiple second branches 420 are provided on a side (upper side in FIG. 2) of the second trunk 410. These second branches 420 are the second detection ends 402 in the above text. The second branches 420 extend in a straight line along a side of the detection channel 230, and an end portion of each second branch 420 terminates on an end portion of the detection channel 230. A second collecting member 430 extending to the surface of the housing is provided at an end (left end in FIG. 2) of the second trunk 410, and the end portion of the second collecting member 430 is the second collecting end 401 described above.

During use of the device, the bottom surface of the bottom plate 200 is provided on the battery housing. Under normal circumstances, the first detection element 300 and the second detection element 400 are spaced apart by the bottom plate 200, so that a resistance value between the first collecting end 301 and the second collecting end 401 is infinite. When liquid leakage of battery occurs, the leaked liquid flows into the gap 500 along the detection channel 230, and finally flows into the first detection end 302 and the second detection end 402 on two sides of the detection channel 230. Therefore, the first detection element 300 is connected to the second detection element 400, so that the resistance value between the first collecting end 301 and the second collecting end 401 is significantly reduced, thereby determining that liquid leakage of battery occurs.

To sum up, the present disclosure has the advantages that detection channels 230 are provided at a bottom of a housing, so that a leaked liquid can enter a gap 500 inside the housing from the detection channels 230, and then a first detection end 302 and a second detection end 402 on two sides of each detection channel 230 are connected together. Therefore, a first detection element 300 is connected to a second detection element 400, and resistance between a first collecting end 301 and a second collecting end 302 is reduced, thereby determining liquid leakage of battery. The device can improve timeliness and accuracy of a detection result.

The above is the description of the embodiments of the present disclosure. The above description of the disclosed embodiments enables those skilled in the art to achieve or use the present disclosure. Multiple modifications to these embodiments are readily apparent to those skilled in the art. The general principles defined herein may be practiced in other embodiments without departing from the spirit or scope of the present disclosure. Therefore, the present disclosure is not limited to these embodiments shown herein, but falls within the widest scope consistent with the principles and novel features disclosed herein.

What is claimed is:

1. A device with a sheet structure for detecting liquid leakage of battery, comprising a housing made of an insulating material, and a first detection element (300) and a second detection element (400) that are arranged in the housing and each of the detection elements are made of a conductive material, wherein the first detection element (300) and the second detection element (400) are spaced apart on the housing and thus are not in contact with each other; multiple detection channels (230) are provided in a bottom surface of the housing, and a layer comprising a gap (500) extending in a horizontal direction is provided inside the housing, and an inner end of each of the multiple detection channels (230) is in communication with the gap (500); the first detection element (300) comprises a first collecting end (301) provided on an outer surface of the housing, and a first detection end (302) provided in the gap (500) and adjacent to the detection channel (230); the second detection element (400) comprises a second collecting end (401) provided on the outer surface of the housing, and a second detection end (402) provided in the gap (500) and adjacent to the detection channel (230); and a resistance between the first collecting end (301) and the second collecting end (401) is measured to determine whether the liquid leakage of battery occurs;

wherein the first detection element (300) has a plurality of first detection ends (302), the second detection element (400) has a plurality of second detection ends (402), two sides of each of the multiple detection channels (230) are respectively provided at one of the plurality of first detection ends (302) and at one of the plurality of second detection ends (402), and the plurality of first detection ends (302) and the plurality of second detection ends (402) both extend along a lengthwise direction of the multiple detection channels (230).

2. The device according to claim 1, wherein the housing comprises a bottom plate (200) and a cover plate (100) provided above the bottom plate (200), the bottom plate (200) comprises a detection area (220), and the multiple detection channels (230) are located in the detection area (220); a bottom surface of the cover plate (100) is provided with an accommodating area (110) recessed upward, and a shape of the accommodating area (110) is adapted to a shape of the detection area (220) and the accommodating area (110) is located above the detection area (220), so that the gap (500) is formed between the bottom plate (200) and the cover plate (100).

3. The device according to claim 2, wherein the detection area (220) in the bottom plate (200) has a thickness not greater than 2 mm.

4. The device according to claim 1, wherein each of the multiple detection channels (230) has a height not greater than 2 mm; and the multiple detection channels (230) are provided in the detection area (220).

5. The device according to claim 1, wherein the first detection element (300) and the second detection element (400) are respectively provided at two ends of the multiple detection channels (230), and the plurality of first detection end (302) and the plurality of second detection end (402) extend in opposite directions.

6. The device according to claim 1, wherein the first detection element (300) comprises a first trunk (310) provided on a side of the bottom plate (200), a plurality of first branches (320) are provided on a side of the first trunk (310), and the plurality of first branches (320) are the plurality of first detection ends (302); each of the plurality of first branches (320) extend along a lengthwise direction of one of the multiple detection channels (230), and an end portion of each of the plurality of first branches (320) terminates on an end portion of one of the multiple detection channels (230); a first collecting member (330) is provided at an end of the first trunk (310), and an end portion of the first collecting member (330) extends out of the outer surface of the housing.

7. The device according to claim 6, wherein the second detection element (400) comprises a second trunk (410) provided on a side of the bottom plate (200), a plurality of second branches (420) are provided on a side of the second trunk (410), and the plurality of second branches (420) are the plurality of second detection ends (402); each of the plurality of second branches (420) extends along a lengthwise direction of one of the multiple detection channels (230), and an end portion of each of the plurality of second branches (420) terminates on an end portion of one of the multiple detection channels (230); a second collecting member (430) is provided at an end of the second trunk (410), and an end portion of the second collecting member (430) extends out of the outer surface of the housing.

* * * * *